(12) United States Patent
Chang et al.

(10) Patent No.: US 12,733,020 B2
(45) Date of Patent: Sep. 8, 2026

(54) PC5 GROUPCAST MESSAGES WITH SELECTED SYSTEM INFORMATION

(71) Applicant: Kyocera Corporation, Kyoto (JP)

(72) Inventors: Henry Chang, San Diego, CA (US); Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 543 days.

(21) Appl. No.: 18/038,405

(22) PCT Filed: Nov. 17, 2021

(86) PCT No.: PCT/US2021/059702

§ 371 (c)(1),
(2) Date: May 23, 2023

(87) PCT Pub. No.: WO2022/119715

PCT Pub. Date: Jun. 9, 2022

(65) Prior Publication Data

US 2024/0008058 A1 Jan. 4, 2024

Related U.S. Application Data

(60) Provisional application No. 63/121,642, filed on Dec. 4, 2020.

(51) Int. Cl.
*H04W 72/30* (2023.01)
*H04W 76/23* (2018.01)
*H04W 76/28* (2018.01)

(52) U.S. Cl.
CPC .......... *H04W 72/30* (2023.01); *H04W 76/23* (2018.02); *H04W 76/28* (2018.02)

(58) Field of Classification Search
None
See application file for complete search history.

(56) References Cited

U.S. PATENT DOCUMENTS 10,383,035 B2 8/2019 Sheng
2018/0092017 A1 3/2018 Freda et al.
2020/0106566 A1 4/2020 Yeo et al.
2020/0322939 A1* 10/2020 Cao ........................ H04W 72/02
2021/0029605 A1* 1/2021 Kadiri ................. H04W 36/085
2023/0292098 A1* 9/2023 Ganesan ............. H04W 84/047
2024/0298163 A1* 9/2024 Wu ....................... H04W 8/005

OTHER PUBLICATIONS

Qualcomm Incorporated; "Discussion on remaining issues of discovery and relay (re)selection," R2-2008965; 3GPP TSG RAN WG2 Meeting #112-e; Oct. 23, 2020.
Ericsson; "RAN2 impacts introduced by Layer 2 SL relay," R2-2009230; 3GPP TSG RAN WG2 Meeting #112-e; Oct. 22, 2020.
Nokia, Nokia Shanghai Bell; "Enhancements for reduction of Re-establishment time," R2-2009268; 3GPP TSG RAN WG2 Meeting #112-e; Oct. 22, 2020.

* cited by examiner

*Primary Examiner* — Anez C Ebrahim

(57) ABSTRACT

A relay user equipment (UE) device transmits selected system information in a PC5 groupcast message, where the selected system information is a subset of system information received from a cell at the relay UE device. A remote UE device receiving the PC5 groupcast message with the selected system information obtains at least system information for accessing the cell where such system information may not be available directly from the cell. The remote UE device manages relay selection/reselection at least partially based on the selected system information.

14 Claims, 7 Drawing Sheets

308

300

TRANSMITTER
304

RECEIVER
306

CONTROLLER
302

MEMORY
310

COMMUNICATION DEVICE

622
FIRST SI FOR CELL 1
628
626
FIRST SELECTED SI
FIRST CANDIDATE RELAY UE DEVICE 601
FIRST SI FOR CELL 1
FIRST BASE STATION (GNB) 624
622
644
FOURTH SELECTED SI
646
FOURTH CANDIDATE RELAY UE DEVICE 604
638
THIRD SI FOR CELL 3
REMOTE UE DEVICE 648
642
640
THIRD SELECTED SI
636
SECOND SELECTED SI
634
THIRD CANDIDATE RELAY UE DEVICE 603
630
SECOND SI FOR CELL 2
600
SECOND CANDIDATE RELAY UE DEVICE 602
SECOND BASE STATION (GNB) 632

PC5 GROUPCAST MESSAGES WITH SELECTED SYSTEM INFORMATION

CLAIM OF PRIORITY

The present application claims the benefit of priority to Provisional Application No. 63/121,642 entitled "System Information for Remote UEs", filed Dec. 4, 2020, assigned to the assignee hereof and hereby expressly incorporated by reference in its entirety.

FIELD

This invention generally relates to wireless communications and more particularly to wireless communication links using relay devices.

BACKGROUND

Many wireless communication systems that employ several base stations that provide wireless service to user equipment (UE) devices enable sidelink communication between two or more UE devices where the UE devices can communicate directly with other UE devices. Such sidelink communications sometimes include one UE device (group leader UE device) that transmits the same data to multiple UE devices in a group. Different transmission techniques often referred to as cast types can be used to transmit the same data to multiple UE devices. Sidelink cast types include at least unicast, groupcast and broadcast. A unicast transmission can only be received by the single UE device that is the intended recipient of the data. Accordingly, multiple transmissions are required to send the same data to multiple UE devices using unicast. A broadcast transmission can typically be received by all UE devices within range of the transmission. A groupcast transmission can only be received by the UE devices that are members of a group. Accordingly, for example, the group leader UE device can transmit the same data in a single transmission using groupcast to two or more UE devices in the group or can send the same data in multiple unicast transmissions to the UE devices.

With sidelink communication, UE devices transmit data signals to each other over a direct link using the cellular resources instead of through a base station. Such Proximity Services (ProSe) communication is sometimes also referred to as device-to-device (D2D) and Peer-to-Peer (P2P). For at least one revision of the 3GPP New Radio (NR) V2X communication specification, sidelink communication is performed over a PC5 interface. Accordingly, the terms PC5 and sidelink are interchangeable when referring to 3GPP releases. In addition, one or more UE devices can be used as relay devices between a UE device and a communication device where the relay device forwards data between a UE device and a communication device. The communication device may be a base station or a destination UE device. In some situations, for example, the UE device may be out of the service area of the base station and the relay UE device provides a communication link routed from such an out-of-coverage (OoC) UE device through a relay UE device to the base station.

SUMMARY

A relay user equipment (UE) device transmits selected system information in a PC5 groupcast message, where the selected system information is a subset of system information received from a cell at the relay UE device. A remote UE device receiving the PC5 groupcast message with the selected system information obtains at least system information for accessing the cell where such system information may not be available directly from the cell. The remote UE device manages relay selection/reselection at least partially based on the selected system information.

DETAILED DESCRIPTION

Figure 1A:
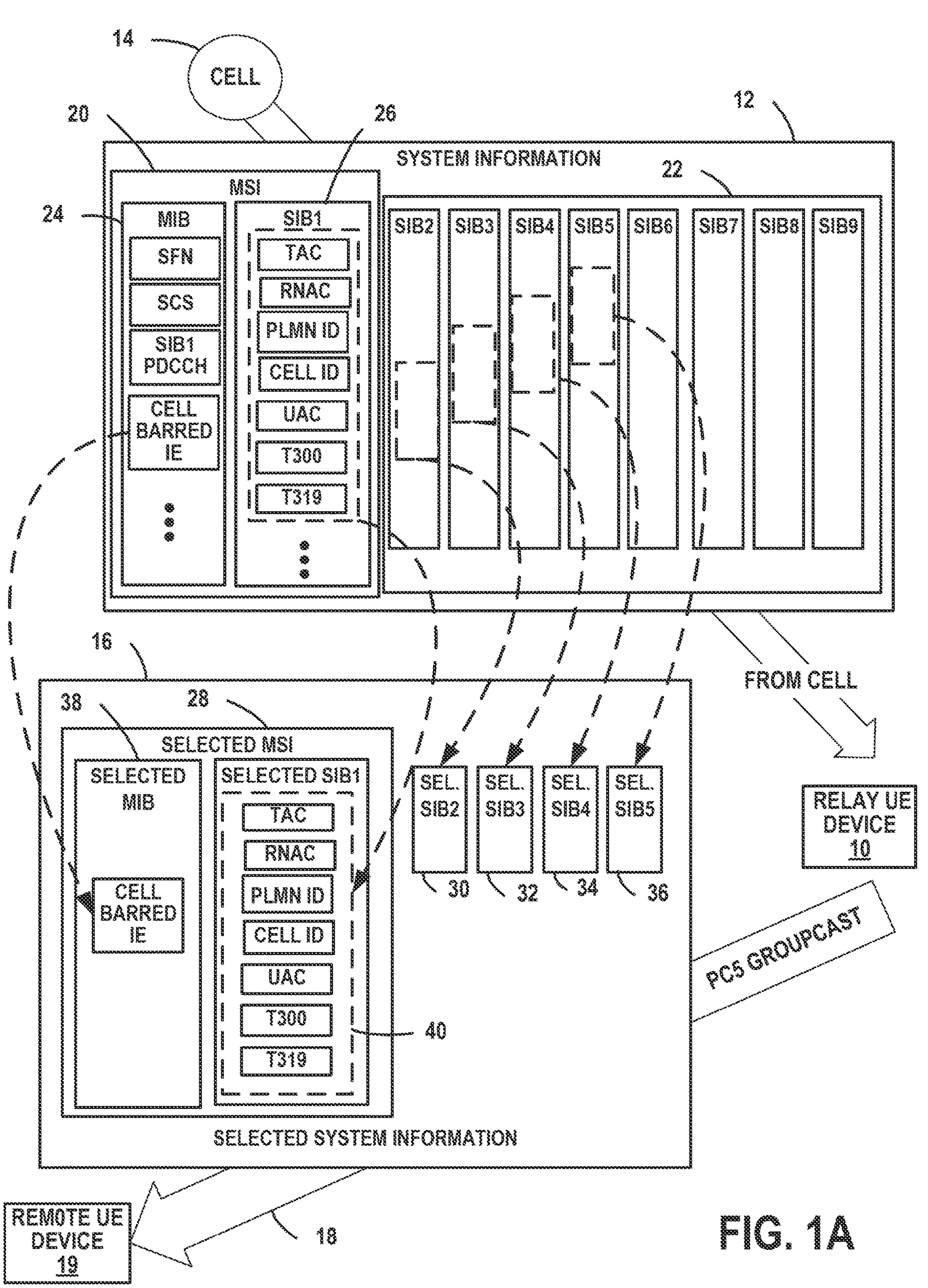
FIG. 1A is a block diagram for an example where a relay UE device receives system information from a cell provided by a base station (gNB) and transmits selected system information in a sidelink groupcast message.

As discussed above, a relay UE device provides connectivity between a remote UE device and a communication device which can be another UE device (destination UE device) or a base station (gNB). The relayed connection between a remote UE device and destination UE device is sometimes referred to as a UE to UE (U2U) relay connection. The relayed connection between a remote UE device and a base station (gNB) is sometimes referred to as a UE to network (U2N) relay connection. In conventional systems where the communication device is a base station (gNB), the relay UE device is required to meet certain criteria to function as a relay. For example, the relay UE device must be in coverage and have a cellular (Uu) communication link to the base station of sufficient quality in order to be available for relaying functions. For U2N relaying, therefore all candidate relay devices are assumed to be within coverage of the base station (gNB). Any relay UE that does not meet the suitability criteria, which is based on satisfying the Uu RSRP threshold requirements, will not be a candidate relay UE device and will not send discovery messages indicating the UE device can support relay functionality. The remote UE device, which may be OoC in many situations, connects to the relay UE device over a sidelink (PC5) communication link. Since either or both the remote UE device and the relay UE device may be moving, the quality of the PC5 link and/or the quality of cellular Uu link may degrade. A link failure of either link will prompt the remote UE device to search for another relay UE device. In at least some conventional systems, the gNB configures or preconfigures the remote UE device with a PC5 quality threshold (e.g., minimum sidelink RSRP (SL-RSRP threshold) or sidelink discovery RSRP (SD-RSRP) threshold) which triggers the remote UE device to begin the relay reselection procedure. Accordingly, when the quality of the PC5 connection to the relay UE device drops below the threshold, the remote UE device searches through candidate relay devices to select another relay UE device with a higher quality sidelink connection. In some relaying situations, a remote UE device is connected to a gNB through a relay UE device that is within coverage of the gNB and is RRC Connected to the gNB. Where the remote UE is within coverage, the remote UE can obtain system information (SI) directly from the gNB. The remote UE device, for example, is capable of receiving System Information Blocks (SIBs) transmitted by the gNB. The remote UE device typically cannot receive system information directly from the gNB where the remote UE device is out-of-coverage (OoC) even though the remote UE is RRC Connected to the gNB. As a result, there is no way, in conventional systems, for the gNB to control the remote UE device while it is not yet connected to the relay UE device. In particular, it may be advantageous for the gNB to control access of particular UE devices to the network, which is typically controlled via system information, and since it is up to the remote UE device to determine whether it is allowed to access the network, the remote UE device needs updated system information to determine whether it is allowed to access the network. Although the remote UE device has the option to use the pre-configured control information to perform relay reselection, the pre-configured control information cannot be updated dynamically by the gNB. More specifically, the OoC remote UE device is not made aware of changes in the gNB system information associated with accessing the gNB. Further, the discovery procedure is intended to work among different Public Land Mobile Networks (PLMNs) and the pre-configured control from one PLMN may differ from that of another PLMN. In particular, frequency priority may differ from one PLMN to another. As a result, the OoC remote UE device may not have the frequency priority of a gNB in a particular PLMN where the remote UE device is attempting to connect to the gNB. In addition, when the remote UE device is selecting/reselecting a relay UE device, it is often useful for the remote UE device to consider the system information associated with the gNBs serving the candidate relay UE devices. Accordingly, there is a need for providing an OoC remote UE device with current system information of the gNB serving a relay UE device.

Although the techniques discussed herein may be applied to various types of systems and communication specifications, the devices of the example operate in accordance with at least one revision of a 3GPP New Radio (NR) V2X communication specification. The techniques discussed herein, therefore, may be adopted by one or more future revisions of communication specifications although the techniques may be applied to other communication specifications where sidelink or D2D is employed. More specifically the techniques may be applied to current and future releases of 3GPP NR specifications. For example, the techniques may also be applied to 3GPP NR (Rel-17).

FIG. 1A is a block diagram for an example where a relay UE device 10 receives system information 12 from a cell 14 provided by a base station (gNB) and transmits selected system information 16 in a sidelink groupcast message 18. For the examples discussed herein, the selected system information 16 is transmitted in a PC5 groupcast message 18 that can be received by all UE devices of a group where the group includes remote UE devices. Although the group can be established for other reasons, the group is a default group for all remote UE devices where the destination L2 ID is default L2 ID used by relay UE devices to provide information to remote UE devices. Multiple relay UE devices may use the same destination L2 ID although the groupcast message include different source L2 IDs. The system information 12 includes information in accordance with conventional systems and typically includes at least Minimum System Information 20 and often includes Other System Information (OSI) 22. MSI 20 includes a Master Information Block (MIB) 24 in an MIB message broadcasted on the Physical Broadcast Channel (PBCH) and a System Information Block 1 (SIB1) 26 sent in a SIB message on the Physical Downlink Shared Channel (PDSCH) through the Radio Resource Control (RRC) layer. Therefore, although the system information 12 is illustrated as single block being transmitted to the candidate relay UE device 10, the information is conveyed over different channels. The OSI may include SIB2, SIB3, SIB4, SIB5, SIB6, SIB7, SIB8 and SIB9 as well as others, such as SIB 12 in some situations. The 5G specification specifies the information contained in the MIB and each of the several SIB messages.

The MIB 24 provides the System Frame Number (SFN), the Subcarrier Spacing (SCS), the SIB1 PDCCH resource, and the cell barred information (cellBarred IE). SIB1 26 includes Cell Selection Information, the Public Land Mobile Network ID (PLMN ID), Tracking Area Code (TAC), Cell Identity (Cell ID), RAN Notification Information, SI scheduling info for OSI, and Serving Cell Information. SIB2 includes cell re-selection information common for intra-frequency, inter-frequency and/or inter-RAT re-selection. SIB3 includes intra-frequency cell re-selection information such as PCI, q-Offset, q-RxLev, q-Qual, and Black cell list. SIB4 includes Inter frequency cell re-selection information such as New Radio Absolute Radio-Frequency Channel Number (NR-ARFCN). SIB5 includes inter-system cell re-selection toward LTE such as EARFCN. SIB6 includes Earth quake and Tsunami Warning System primary notifications. SIB7 includes Earth quake and Tsunami Warning System secondary notifications. SIB8 includes Commercial Mobile Alert services (CMAS) notifications. SIB9 includes timing information for UTC, GPS and local time. In some situations, SIB 12 may be sent which at least includes the sl-TxPoolSelectedNormal IE that provides information regarding the shared resource pool for discovery and traffic.

For the example of FIG. 1A, the candidate relay UE device 10 processes the first system information for the cell 14 to generate the selected system information 16 which is a subset of the system information 12. The selected system information 16 includes at least selected MSI 28 which is a subset of the MSI 20. In some situations, the selected system information may include portions (subsets) of other system information. For the examples, the selected system information 16 may include selected SIB2 30, selected SIB3 32, selected SIB4 34, and selected SIB5 36, which are subsets of the relay-received SIB2, SIB3, SIB4 and SIB5, respectively. For NR, the base station does not typically transmit all the SIBs periodically. Typically, only the MIB, SIB and the emergency related SIBs (i.e., SIB 6, SIB7 and SIB 8) are automatically transmitted. The other SIBs are sent based on the SIB requests from UE devices. Similarly, this is also expected for forwarding by the relay UE device's SIBs to remote UE devices. The MSI 28 and emergency related SIBs are forwarded to remote UE devices without request, while the other SIBs are forwarded upon request from one or more remote UE devices. In particular, the remote UE device sends a Sidelink SIB Request message to its PC5 connected relay UE device, and the relay UE device requests the SIB over the Uu link via either Msg 1 (PRACH) or Msg 3 (RRCSystemRequest Msg).

For the examples herein, the selected MSI 28 includes remote UE cell access information 38 for accessing the cell 14 where the remote UE cell access information 38 may include the cell barred information (cellBarred IE), UAC configuration, PLMN ID, TAC, RAN based Notification Area Code (RNAC), Cell ID, T300 timer, and T319 timer. The TAC is for tracking area update when a UE device is in RRC IDLE state. The RNAC tracking area update when the UE is in RRC INACTIVE state. The T300 timer is used for establishing connection to the cell when the UE device is initially in IDLE state and is started upon sending a RRC Setup Request. The T319 timer is used for resuming a connection to the cell when the UE is initially in INACTIVE state and is started upon transmission of a RRC Resume Request. For the examples herein, the selected MSI 28 includes selected MBI 38 and selected SIB1 40. The selected MBI 38 includes the cellBarred IE from the MBI 24 which indicated whether the cell is barred, regardless of the UE type of UE category. For the examples, the selected SIB1 40 includes UAC information, T300 timer, T319 timer, PLMN ID, Cell ID, TAC, and RNAC. The T300 timer, T319 timer and the UAC information, such as uac-BarringInfo IE, are sent in the ue-TimersAndConstants IE. The CellAccessRelatedInfo IE includes the PLMN-IdentityInfo IE which includes PLMN ID, Cell ID, TAC, and RNAC.

Figure 1B:
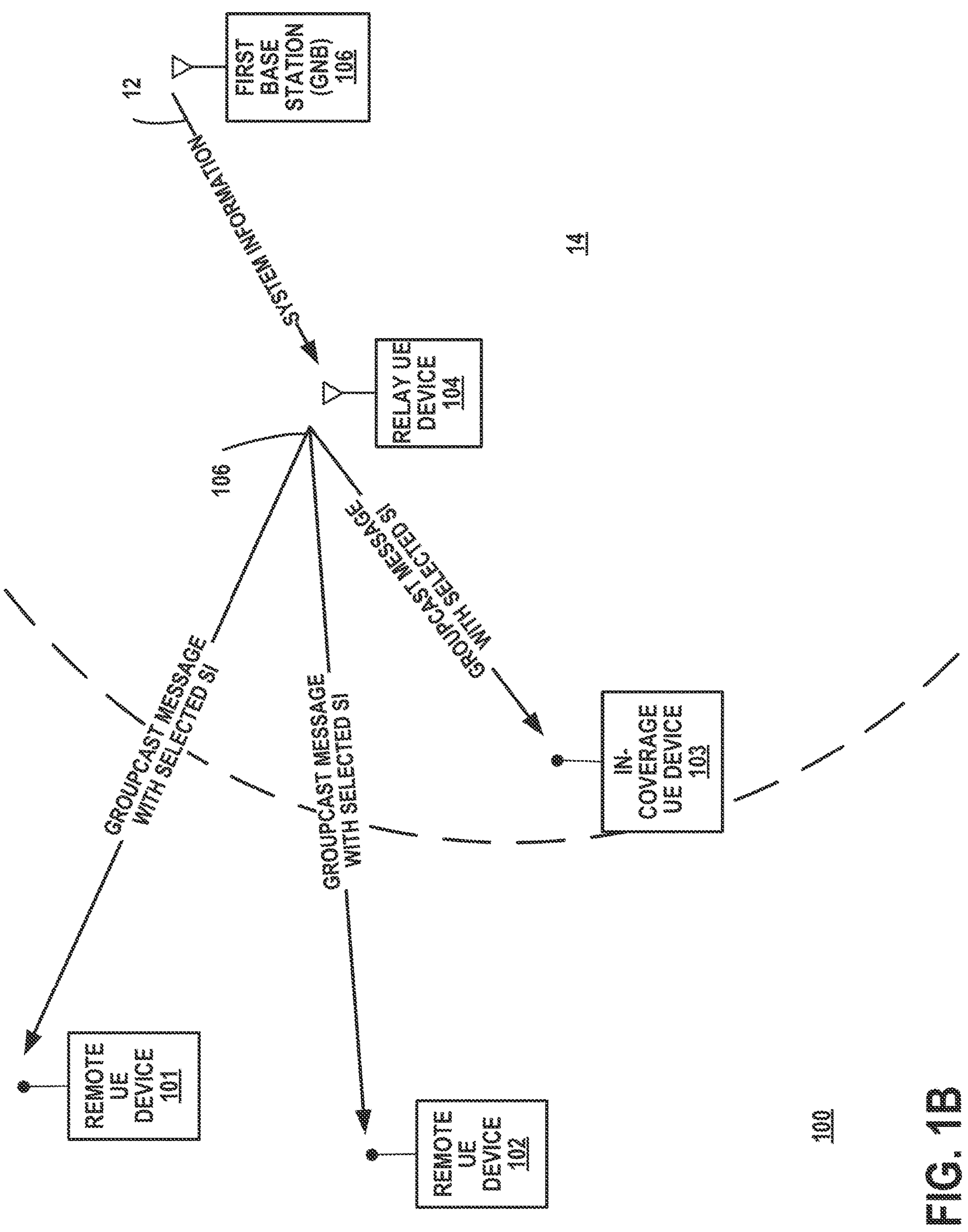
FIG. 1B is a block diagram of an example of a communication system where a plurality of UE devices are configured to receive, from a relay UE device, selected system information in a PC5 groupcast message.

FIG. 1B is a block diagram of an example of a communication system 100 where a plurality of UE devices 101-103 are configured to receive, from a relay UE device 104, selected system information 16 in a PC5 groupcast message 18. The selected system information 16 is a subset of system information 12 transmitted by the serving cell 14 of the relay UE device 104. Accordingly, the system 100 of FIG. 1B is an example where multiple UE devices receive a groupcast message from a remote UE device in accordance with the example of FIG. 1A. For the example, the UE devices 101-104 may be any type of device that can receive signals from, and transmit signals to, base stations (gNBs) and other UE devices. The UE devices operate in a communication system that includes a plurality of base stations that each provide wireless service within a service area. Each base station provides wireless service within one or more cells. System information may be different between cells of the same gNB. Accordingly, for the example of FIG. 1B, the system information 12 is associated with a cell 14 provided by a gNB 106.

The examples discussed herein operate in accordance with many of the assumptions and characteristics of conventional UE-to-Network (U2N) relaying conventions. The discussed techniques, however, may be applied in other systems where one or more of the assumptions and characteristics may differ. As is known, U2N relaying was first specified in Rel-13 and further studied in Rel-15 where the legacy U2N relaying mechanism was considered as baseline. Systems operating in accordance with these standards operate in accordance with several characteristics. A ProSe U2N relay device is always in-coverage of the network. A ProSe U2N relay device performing sidelink communication for ProSe UE-to-Network Relay operation is in the RRC_CONNECTED state. The base station (gNB) controls whether a UE device can act as a ProSe U2N relay device. The gNB may provide transmission resources for ProSe U2N relay discovery using broadcast signaling for RRC_IDLE state, RRC_INACTIVE state and dedicated signaling for RRC_CONNECTED state. The gNB may provide reception resources for ProSe U2N relay discovery using broadcast signaling (i.e., SIB). The gNB may broadcasts a minimum and/or a maximum Uu link quality (RSRP) threshold(s) that the ProSe U2N relay device needs to satisfy before it can initiate a U2N relay discovery procedure. The remote UE device can transmit ProSe U2N relay discovery solicitation messages while in all RRC states depending on the configuration of resources for ProSe U2N relay discovery. The remote UE device performs radio measurements at the PC5 interface and uses the measurements for ProSe U2N relay selection and reselection along with higher layer criterion. Although not currently required by a NR communication specification, the remote UE device typically selects the ProSe U2N relay device, which satisfies higher layer criterion and has the best PC5 link quality among all suitable candidate ProSe U2N relays. Currently, for NR sidelink-based relay, a single-hop relay is considered, but extension to multi-hop relaying may also be supported.

For the example of FIG. 1B, two remote UE devices 101, 102 and an in-Coverage UE device 103 are in a groupcast group that can receive groupcast messages from the relay UE device 104. In some situations, the groupcast group may also include the relay UE device 104. The relay UE device at least allows a groupcast group to be formed where the group includes all remote UE devices connected to the relay UE device. For the example, a default L2 ID is used for groupcast to remote UE devices. As discussed below with reference to FIG. 4, the groupcast message including the selected system information is transmitted in accordance with a Discontinuous Reception (DRX) cycle in the example. In some situations, the DRX cycle is in accordance with a preconfigured or default DRX configuration. The default DRX configuration is provided by the serving cell in SIB 12 for the examples herein. In other situations, the DRX configuration information defining at least some of the DRX parameters is provided to the UE devices 101-103 by the relay UE device 104.

Each UE device 101-103 evaluates the selected system information when performing relay selection/reselection. Each UE device 101-103, therefore, performs relay reselection at least partially based on the selected system information. In some situations, a remote UE device may determine that the relay UE device should not be used because the selected system information indicates that the serving gNB 106 cannot support the services required by the UE device. In another case, the remote UE device determines that the selected system information indicates that the remote UE device is prohibited from accessing the cell. For the examples herein, the relay reselection may be based on criteria other than system information.

Typically, the cell also configures the frequency priority for IDLE/INACTIVE UE devices to establish which frequencies are used first when the IDLE/INACTIVE UE devices try to access the cell. Such configuration may be advantageous in managing congestion control and load balancing among frequency channels at the NW, for example. The frequency priority is broadcasted in SIB4 with at least two pertinent IEs including the cellReselectionPriority IE and the cellReselectionSubPriority IE. The cellReselectionPriority is a mandatory field and provides the absolute priority of concerned carrier frequency and is used in the cell reselection procedure. The highest priority value is 7 and lowest priority value is 0. The cellReselectionSub- Priority is an optional field and a parameter indicates a fractional value to be added to the value of cellReselection-Priority to obtain the absolute priority of concerned carrier frequency for E-UTRA and NR. Value oDot2 corresponds to 0.2, value oDot4 corresponds to 0.4 and so on. The Absolute priority is the combination of cellReselectionPriority and CellReselectionSubPriority (if configured).

Frequency priority not only impacts the relay UE device which is connected to the cell in the Uu link, but can also influence the operation of a remote UE. If the relay UE device only serves as a relay to the remote UE device, the access of the remote UE device to the network impacts the resource usage of the network. In one example, therefore, the remote UE device should preferably connect to the cell using the highest priority frequency that is available. If there are two relay UE devices connected to the gNB where one is on a first frequency (F1) and the other is on a second frequency (F2) having higher priority than F1, the remote UE device selects the relay UE device using F2.

In some examples, therefore, the selected system information includes frequency priority IEs from SIB4. Furthermore, the relay UE device also indicates to the remote UE device frequency of the Uu link on which the relay UE deice is camped. In one technique, the relay UE device indicates the frequency that the relay UE device is camped on and sends the selected system information including the selected SIB4 IEs to the remote UE device. With another technique, the relay UE device only indicates it is camped on a frequency when it is not the highest priority frequency based on SIB4.

After selecting a relay UE device, the remote UE device uses the selected system information provided by the selected relay UE device to establish the U2N connection to the serving cell through the selected relay UE device. Therefore, the remote UE device uses the current system information for the cell instead of preconfigured system information. This provides a mechanism for the gNBs to more efficiently manage access to the network. Since system information can be dynamically configured, the cell expects all the UE devices that access the cell to operate according to the latest system information.

A remote UE device may evaluate the system information of other cells in determining whether to engage ins relay reselection. The system formation may be provided by the selected information received over the PC5 groupcast message, may have been received from other relay UE devices that may be served by other cells, or may be preconfigured system information.

Figures 2, 3:
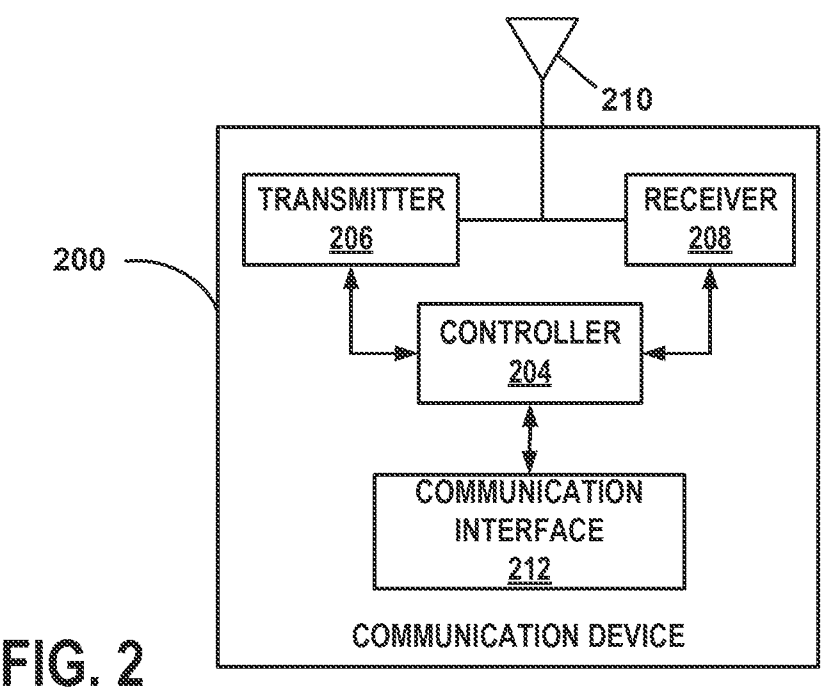
FIG. 2 is a block diagram of an example of a base station.
FIG. 3 is a block diagram of an example of a UE device suitable for use as each of the UE devices.

FIG. 2 is a block diagram of an example of a base station 200 suitable for use as both the base stations 124, 132 and any base station serving any of the UE devices. The base station 200 includes a controller 204, transmitter 206, and receiver 208, as well as other electronics, hardware, and code. The base station 200 is any fixed, mobile, or portable equipment that performs the functions described herein. The various functions and operations of the blocks described with reference to the base station 106, 200 may be implemented in any number of devices, circuits, or elements. Two or more of the functional blocks may be integrated in a single device, and the functions described as performed in any single device may be implemented over several devices. The base station 200 may be a fixed device or apparatus that is installed at a particular location at the time of system deployment. Examples of such equipment include fixed base stations or fixed transceiver stations. Although the base station may be referred to by different terms, the base station is typically referred to as a gNodeB or gNB when operating in accordance with one or more communication specifications of the 3GPP V2X operation. In some situations, the base station 200 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 200 may be a portable device that is not fixed to any particular location.

The controller 204 includes any combination of hardware, software, and/or firmware for executing the functions described herein as well as facilitating the overall functionality of the base station 200. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2 perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals and can apply any one of a plurality of modulation orders. The demodulator demodulates any uplink signals received at the base station 200 in accordance with one of a plurality of modulation orders.

The base station 200 includes a communication interface 212 for transmitting and receiving messages with other base stations. The communication interface 212 may be connected to a backhaul or network enabling communication with other base stations. In some situations, the link between base stations may include at least some wireless portions. The communication interface 212, therefore, may include wireless communication functionality and may utilize some of the components of the transmitter 206 and/or receiver 208.

FIG. 3 is a block diagram of an example of a UE device 300 suitable for use as each of the UE devices 101-104, 106. In some examples, the UE device 300 is any wireless communication device such as a mobile phone, a transceiver modem, a personal digital assistant (PDA), a tablet, or a smartphone. In other examples, the UE device 300 is a machine type communication (MTC) communication device or Internet-of-Things (IOT) device. The UE device 300, therefore is any fixed, mobile, or portable equipment that performs the functions described herein. The various functions and operations of the blocks described with reference to UE device 300 may be implemented in any number of devices, circuits, or elements. Two or more of the functional blocks may be integrated in a single device, and the functions described as performed in any single device may be implemented over several devices.

The UE device 300 includes at least a controller 302, a transmitter 304 and a receiver 306. The controller 302 includes any combination of hardware, software, and/or firmware for executing the functions described herein as well as facilitating the overall functionality of a communication device. An example of a suitable controller 302 includes code running on a microprocessor or processor arrangement connected to memory. The transmitter 304 includes electronics configured to transmit wireless signals. In some situations, the transmitter 304 may include multiple transmitters. The receiver 306 includes electronics configured to receive wireless signals. In some situations, the receiver 306 may include multiple receivers. The receiver 304 and transmitter 306 receive and transmit signals, respectively, through antenna 308. The antenna 308 may include separate transmit and receive antennas. In some circumstances, the antenna 308 may include multiple transmit and receive antennas.

The transmitter 304 and receiver 306 in the example of FIG. 3 perform radio frequency (RF) processing including modulation and demodulation. The receiver 304, therefore, may include components such as low noise amplifiers (LNAs) and filters. The transmitter 306 may include filters and amplifiers. Other components may include isolators, matching circuits, and other RF components. These components in combination or cooperation with other components perform the communication device functions. The required components may depend on the particular functionality required by the communication device.

The transmitter 306 includes a modulator (not shown), and the receiver 304 includes a demodulator (not shown). The modulator can apply any one of a plurality of modulation orders to modulate the signals to be transmitted as part of the uplink signals. The demodulator demodulates the downlink signals in accordance with one of a plurality of modulation orders.

Figure 4:
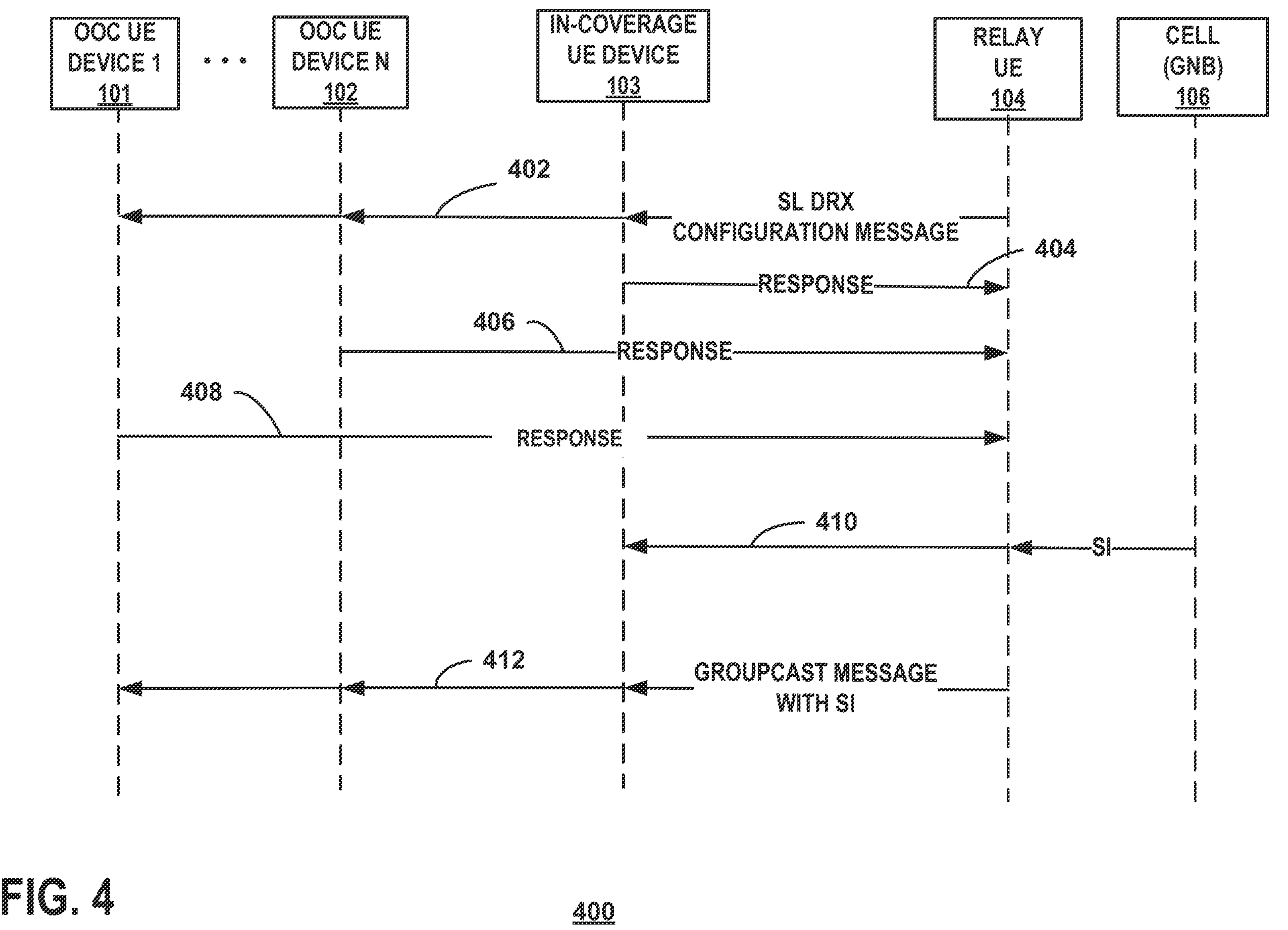
FIG. 4 is a message diagram of communication for an example where the relay UE device provides DRX configuration information to the UE devices and transmits the groupcast message with system information in accordance with the DRX configuration.

FIG. 4 is a message diagram of communication 400 for an example where the relay UE device 104 provides DRX configuration information to the UE devices 101-103 and transmits the groupcast message with system information in accordance with the DRX configuration. The messaging procedure is an example of communication in the system 100 discussed above with reference to FIG. 1B.

At transmission 402, the relay UE device 104 transmits a SL DRX configuration message to the groupcast group. The SL DRX configuration message includes group DRX information that establishes a group DRX cycle for the groupcast group that includes UE devices 101-103. For the example, the DRX cycle is a Long DRX Cycle in accordance with at least one revision of the 3GPP communication standard. The group DRX information includes at least the DRX cycle, the ON Duration Timer and the DRX Inactivity Timer. The DRX cycle established the scheduled timing of the ON times of the UE devices. The ON Duration Timer is the minimum time the UE devices should remain in the ON state and the DRX Inactivity Timer determines how long the UE devices remain ON after a new downlink or uplink transmission. In accordance with revisions of the 3GPP communication specification, the drx-Long-CycleStartOffset parameter defines the long DRX cycle length as well as the DRX offset. The DRX offset is used to calculate the starting subframe number for the DRX cycle. The ON Duration Timer is provided by the drx-onDurationTimer parameter and the DRX Inactivity Timer is provided by the drx-Inactivity-Timer parameter in accordance with the 3GPP specification. The group DRX information may include other parameters in some situations.

For the example, the message is transmitted during the active time of the original DRX cycle that was previously established or is based on a pre-configuration, which includes the ON duration time and while the inactivity timer is running. When the UE devices 101-103 are operating in accordance with a DRX cycle, the message can only be received when the UE devices are in during the active time. In another scenario, however, the UE devices do not follow a DRX cycle and remain in the active ON state such that the SL DRX configuration message can be transmitted at any time. Once the SL DRX cycle is established for the group the remote (OoC) UE devices 101, 102 operate in accordance with the group DRX cycle and the In-Coverage UE device operates in accordance with the DRX configuration of the cell and the SL DRX configuration.

Each UE device 101-103 transmits a response to the SL DRX configuration message the transmissions 404, 406, 408. In some situations, the response is a SL DRX configuration response message sent transmitted over PC5 to the relay UE device 104. In other situations, the response is in accordance with SL Hybrid Automatic Repeat Request (HARQ).

At transmission 410, gNB 106 transmits system information (SI) for the cell 14. The SI information may also include SI information for neighboring cells. For the example of FIG. 4, the SI information is broadcasted and may be the system information 12 discussed above with reference to FIG. 1A. The system information transmission 410 is received by the relay UE device 104 and the In-Coverage UE device 103 and is not received by the remote UE devices 101, 102 in the example.

At transmission 412, the groupcast message with the selected system information is transmitted to the UE devices 101-103. The groupcast message is transmitted during the ON duration time of the group DRX cycle. The groupcast message may be sent in response to one of the UE devices requestion system information. In some situations, the groupcast is an initial system information message after the groupcast group is formed and the group DRX cycle is established. The groupcast message may also be triggered by change in system information. For example, the gNB may send a Short Message to its in-coverage UE devices to inform them of SI changes/updates. This allows the UE devices to request one or more of the updated SIs. The relay UE acquires the updated SIs based on what is needs of the remote UE devices and sends the updated SIs via groupcast to the remote UE devices. Instead of forwarding the short message, the relay UE may also decide to send all the updated SIBs to its remote UEs. In some situations, the system information in the groupcast message is not a subset of the system information 12 and simply include forwarding one or more SIBs or other SI received from the gNB. In situations where the In-Coverage UE device 103 had previously received the most current system information from the gNB 106, the In-Coverage UE device 103 may discard the system information received from the relay UE device 104.

In some situations, the gNB established the DRX configuration using PC5-RRC messaging. Therefore, the new DRX configuration may be broadcast/groupcast in PC5. In other cases, for the remote UEs that are PC5-RRC connected to the relay UE devices, the relay UE device may send a RRCReconfigurationSidelink message to the PC5 connected remote UE device where message contains the Sidelink DRX Configuration Information Element with the requested DRX configuration.

In some situations, it may be advantageous for the cell to determine if a better sidelink DRX configuration should be used. The cell (gNB), may evaluate, for example, the DRX configuration needed for the relay UE to monitor the remote UE device's paging occasions. In one example of such a procedure, the relay UE device negotiates with remote UE devices on a sidelink DRX configuration. The relay UE device then informs the cell of the preferred DRX configuration. The cell (gNB) can either accept the relay UE device's proposed sidelink DRX configuration or propose an alternative sidelink DRX configuration. The relay UE device sends an ACK back to the Cell for the alternate sidelink DRX configuration, if configured. The relay UE device informs the remote UEs of the updated sidelink DRX configuration.

Figure 5:
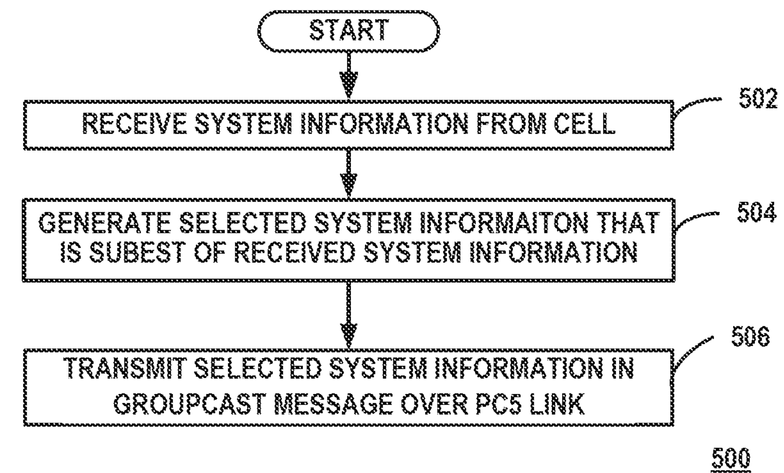
FIG. 5 is a flow chart of an example of a method for conveying selected system information to a remote UE device.

FIG. 5 is a flow chart of an example of a method for conveying selected system information to a remote UE device. The example is performed by a relay UE device and can therefore be performed by a relay UE device 10, 104, 300 discussed above.

At step 502, system information is received from a cell. In accordance with known techniques, a gNB providing a cell to the relay UE device transmits system information. As discussed above, the system information includes MSI and may include OSI.

At step 504, selected system information is generated from the received system information. The relay UE device selects system information that is useful to a remote UE device to generate selected system information which is portion or subset of the system formation. For at least some examples, the selected system information includes at least a subset of MSI. The selected system information may also include subsets of information of other SIBs received from the cell.

At step 506, the selected system information is transmitted in a groupcast message over a PC5 link to remote UE devices part of groupcast group. For the example, the relay UE device transmits the selected system information in a groupcast message to all remote UE devices connected to the relay UE device.

Figure 6:
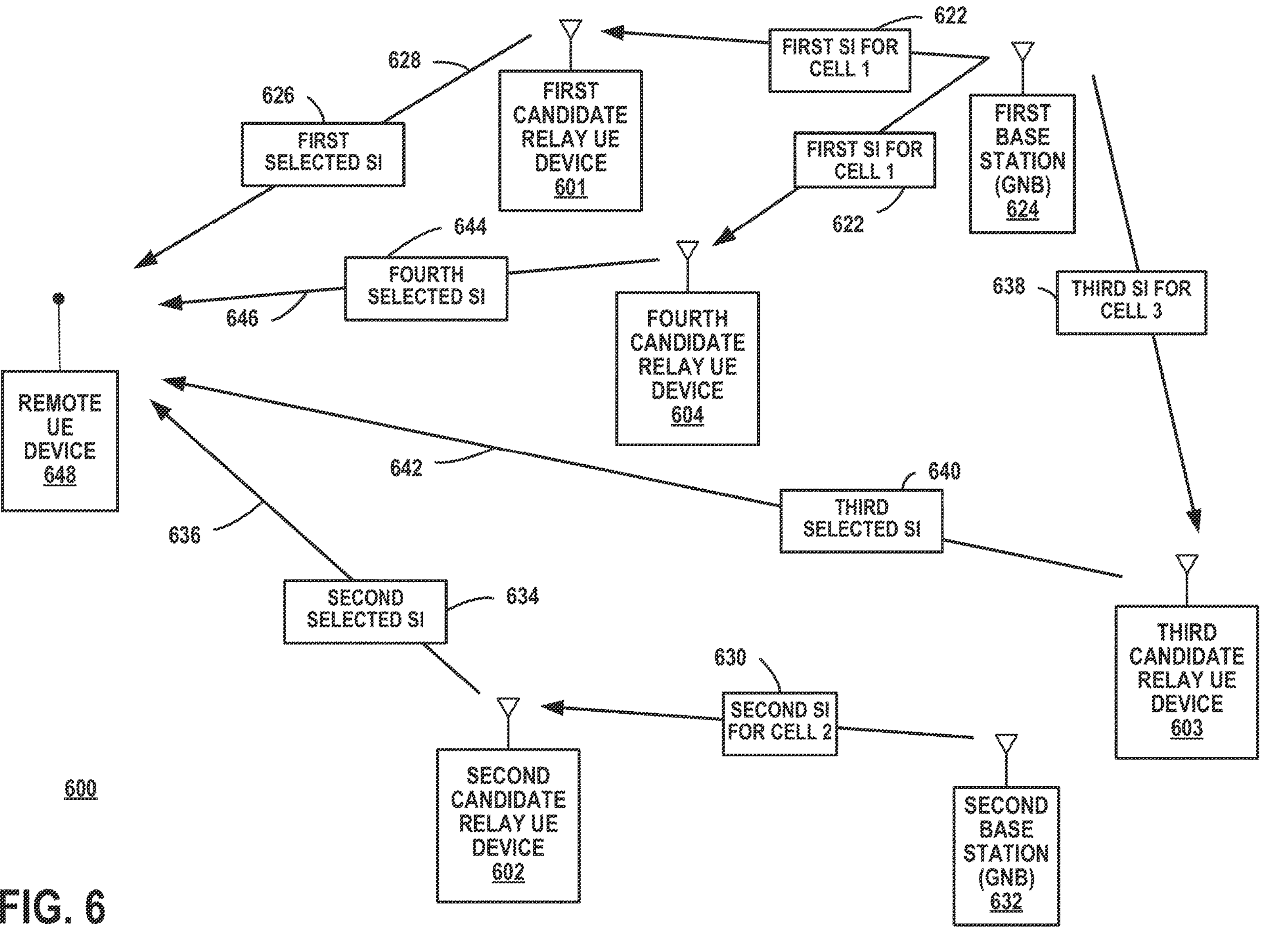
FIG. 6 is a block diagram of an example of a communication system where each of a plurality of candidate relay UE devices transmits selected system information in a sidelink groupcast message where each selected system information is a subset of system information received from the serving cell of the candidate relay UE device.

FIG. 6 is a block diagram of an example of a communication system 600 where a plurality of candidate relay UE devices 601-604 transmit selected system information in sidelink transmissions where each selected system information is a subset of system information received from the serving cell of the candidate relay UE device. For the example, the sidelink transmissions are PC5 groupcast messages. Accordingly, the system 600 of FIG. 6 is an example where multiple relay candidate UE devices include selected system information in sidelink transmissions that are received by a remote UE device in accordance with the example of FIG. 1A. In some situations, one or more of the sidelink transmissions may be other types of PC5 transmissions such a PC5 discovery signal that can be received by any UE device. Also, the PC5 groupcast message may be transmitted as part of discovery signal in some circumstances. Therefore, at least one of the sidelink transmissions is a PC5 groupcast message and other PC5 broadcast signals can be used to provide the selected system information to one or more remote UE devices. For the example, the UE devices may be any type of device that can receive signals from, and transmit signals to, base stations (gNBs) and other UE devices. The UE devices operate in a communication system that includes a plurality of base stations that each provide wireless service within a service area. Each base station provides wireless service within one or more cells. System information may be different between cells of the same gNB. Accordingly, for the example of FIG. 6, each system information is associated with a unique cell where one or more cells are provided by a gNB. In the interest of identification and clarity, the terms "first", "second", "third" and "fourth" are used to label devices, equipment, and signals discussed with reference to FIG. 6. These terms are not intended to imply any preference or chronological order of the labeled items. Accordingly, the terms may be applied in a different manner without changing the description.

The examples discussed herein operate in accordance with many of the assumptions and characteristics of conventional UE-to-Network (U2N) relaying conventions. The discussed techniques, however, may be applied in other systems where one or more of the assumptions and characteristics may differ. As is known, U2N relaying was first specified in Rel-13 and further studied in Rel-15 where the legacy U2N relaying mechanism was considered as baseline. Systems operating in accordance with these standards operate in accordance with several characteristics. A ProSe U2N relay device is always in-coverage of the network. A ProSe U2N relay device performing sidelink communication for ProSe UE-to-Network Relay operation is in the RRC_CONNECTED state. The base station (gNB) controls whether a UE device can act as a ProSe U2N relay device. The gNB may provide transmission resources for ProSe U2N relay discovery using broadcast signaling for RRC_IDLE state, RRC_INACTIVE state and dedicated signaling for RRC_CONNECTED state. The gNB may provide reception resources for ProSe U2N relay discovery using broadcast signaling. The gNB may broadcasts a minimum and/or a maximum Uu link quality (RSRP) threshold (s) that the ProSe U2N relay device needs to satisfy before it can initiate a U2N relay discovery procedure. The remote UE device can transmit ProSe U2N relay discovery solicitation messages while in all RRC states depending on the configuration of resources for ProSe U2N relay discovery. The remote UE device performs radio measurements at the PC5 interface and uses the measurements for ProSe U2N relay selection and reselection along with higher layer criterion. Although not currently required by a NR communication specification, the remote UE device typically selects the ProSe U2N relay device, which satisfies higher layer criterion and has the best PC5 link quality among all suitable candidate ProSe U2N relays. Currently, for NR sidelink-based relay, a single-hop relay is considered, but extension to multi-hop relaying may also be supported.

For the example of FIG. 6, the first candidate relay UE device 601 receives first system information 622 for a cell (Cell 1) from a gNB (base station) 624. The first candidate relay UE device 601 processes the first system information 622 as discussed above with reference to FIG. 1A and FIG. 1B to generate first selected system information 626. The first candidate relay UE device 601 transmits the first selected system information 626 in a first sidelink groupcast message 628. In some situations, the sidelink groupcast messages discussed with reference to FIG. 6 may be discovery signals transmitted in accordance with either the Model A discovery procedure or the Model B discovery procedure. With Model A, the relay UE devices periodically broadcast announcement messages to indicate their presence and provided connectivity services. With Model B, the procedure is initiated by a remote UE device, which broadcasts solicitation messages with the desired connectivity service. A relay UE device that can provide the solicited service sends a response message. Accordingly, where the groupcast message is transmitted as a discovery signal, the sidelink discovery messages may be the initial transmission of the discovery procedure or may be a response to the initial transmission of a remote UE device. Remote UE devices of the group may receive the groupcast discovery message.

The groupcast messages are transmitted using the L2 ID of the relay UE device and a destination L2 ID applied to the group of remote UE devices. For the examples herein, destination L2 ID is a default ID used for transmitting groupcast messages to remote UE devices. The same default L2 ID may be used by all candidate relay UE devices. Although the groupcast messages from the relay UE devices use the same destination L2 ID, each relay UE device uses it unique L2 ID for the groupcast message. A remote UE device, therefore, can identify the relay UE device based on the groupcast message and perform selection/reselection based on the selected system information transmitted in the groupcast message.

Continuing with the example of FIG. 6, the second candidate relay UE device 602 receives second system information 630 for a cell (Cell 2) from a gNB (base station) 632. The second candidate relay UE device 102 processes the second system information 630 as discussed above with reference to FIG. 1A and FIG. 1B to generate second selected system information 634. The second candidate relay UE device 102 transmits the second selected system information 634 in a second sidelink groupcast message 136.

The third candidate relay UE device 603 receives third system information 638 for a cell (Cell 3) from a gNB (base station) 624. For the example, therefore, the first gNB 624 provides at least two cells including Cell 1 and Cell 3. The third candidate relay UE device 603 processes the third system information 638 as discussed above with reference to FIG. 5 to generate third selected system information 640. The third candidate relay UE device 603 transmits the second selected system information 640 in a third sidelink groupcast message 642.

Continuing with the example of FIG. 6, the fourth candidate relay UE device 604 receives first system information 622 for the cell (Cell 1) from the gNB (base station) 624. Accordingly, for the example, both the first candidate relay UE device 601 and the fourth candidate relay UE device 604 are served by the same cell (Cell 1) and, therefore, receive the same system information 622. The fourth candidate relay UE device 604 processes the first system information 622 as discussed above with reference to FIG. 1A and FIG. 1B to generate fourth selected system information 644. For the example, the first selected system information 626 and the fourth selected system information 644 are the same. The first selected system information 626 may be different from the fourth selected system information 644 in some situations where, for example, one candidate relay UE device includes additional selected system information. The fourth candidate relay UE device 604 transmits the first selected system information 644 in a first sidelink groupcast message 646.

Accordingly, for the example, a remote UE device 648 receives four sidelink groupcast signals 628, 636, 642, 646 and evaluates the selected system information 626, 634, 640, 644 received in the four groupcast signals. The number of received sidelink groupcast signals may be different in other situations where the number depends on the number of candidate relay UE devices in the area and the services they can provide. The remote UE device 648 performs relay selection/reselection at least partially based on the selected system information. In some situations, for example, the remote UE device 648 may determine that a particular candidate relay UE device should not be selected because the selected system information indicates that the serving gNB cannot support the services required by the remote UE device 648. In another case, the remote UE device determines that the selected system information indicates that the remote UE device is prohibited from accessing the cell. For the example, the relay selection/reselection is in accordance with conventional techniques that are based on criteria other than system information. For example, in the situation where two relay UE devices are served by the same cell, the remote UE device may prefer to select the relay UE device that includes a higher quality PC5 connection.

Typically, the cell also configures the frequency priority for IDLE/INACTIVE UE devices to establish which frequencies are used first when the IDLE/INACTIVE UE devices try to access the cell. Such configuration may be advantageous in managing congestion control and load balancing among frequency channels at the NW, for example. The frequency priority is broadcasted in SIB4 with at least two pertinent IEs including the cellReselectionPriority IE and the cellReselectionSubPriority IE. The cellReselectionPriority is a mandatory field and provides the absolute priority of concerned carrier frequency and is used in the cell reselection procedure. The highest priority value is 7 and lowest priority value is 0. The cellReselectionSubPriority is an optional field and a parameter indicates a fractional value to be added to the value of cellReselectionPriority to obtain the absolute priority of concerned carrier frequency for E-UTRA and NR. Value oDot2 corresponds to 0.2, value oDot4 corresponds to 0.4 and so on. The Absolute priority is the combination of cellReselectionPriority and CellReselectionSubPriority (if configured).

Frequency priority not only impacts the relay UE device which is connected to the cell in the Uu link, but can also influence the operation of a remote UE. If the relay UE device only serves as a relay to the remote UE device, the access of the remote UE device to the network impacts the resource usage of the network. In one example, therefore, the remote UE device should preferably connect to the cell using the highest priority frequency that is available. If there are two relay UE devices connected to the gNB where one is on a first frequency (F1) and the other is on a second frequency (F2) having higher priority than F1, the remote UE device selects the relay UE device using F2.

In some examples, therefore, the selected system information includes frequency priority IEs from SIB4. Furthermore, the relay UE device also indicates to the remote UE device the frequency of the Uu link on which the relay UE deice is camped. In one technique, the relay UE device indicates the frequency the relay UE device is camped on and sends the selected system information including the selected SIB4 IEs to the remote UE devices. With another technique, the relay UE device only indicates it is camped on a frequency when it is not the highest priority frequency based on SIB4.

After selecting a relay UE device, the remote UE device 648 uses the selected system information provided by the selected relay UE device to establish the U2N connection to the serving cell through the selected relay UE device. Therefore, the remote UE device uses the current system information for the cell instead of preconfigured system information. This provides a mechanism for the gNBs to more efficiently manage access to the network. Since system information can be dynamically configured, the cell expects all the UE devices that access the cell to operate according to the latest system information.

Figure 7:
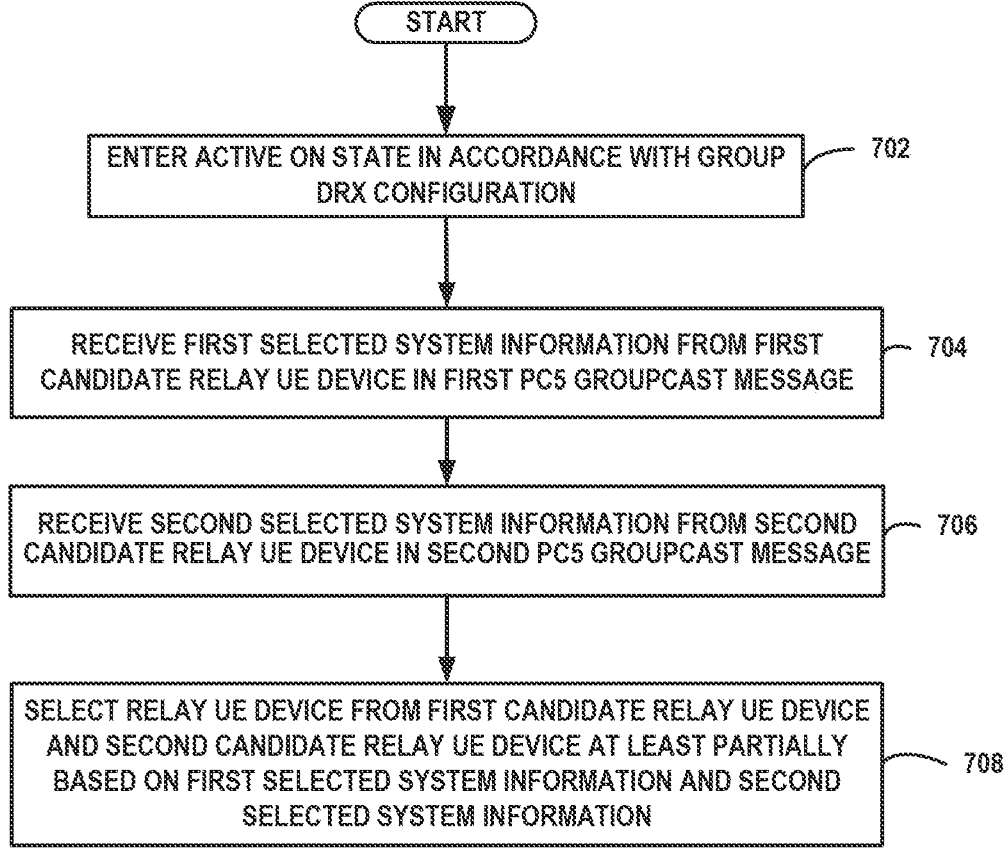
FIG. 7 is a flow chart of an example of a method of relay reselection based on selected system information received from a relay UE device.

FIG. 7 is a flow chart of an example of a method of relay reselection based on selected system information received from candidate relay UE devices. The method is performed by a remote UE device that is selecting or reselecting a relay UE device to maintain or establish a U2N relay connection. Accordingly, the method may be performed any of the remote UE devices 19, 101, 102, 200, 648 discussed above.

At step 702, the remote UE device enters the active ON state on accordance with the groupcast DRX configuration. For the example, the remote UE device applies the previously established DRX configuration to determine times to actively receive signals.

At step 704, first selected system information is received from a first candidate relay UE device in a first PC5 groupcast message. The first selected system information is a subset of the system information received by the first candidate relay UE device from its serving cell.

At step 706, second selected system information is received from a second candidate relay UE device in a second PC5 groupcast message. The second selected system information is a subset of the system information received by the second candidate relay UE device from its serving cell. For the example, the second selected system information is received in a PC5 groupcast message. In some situations, however, the second selected information may be obtained using other means. The system information may be received in broadcast message or in a discovery signal. Further, the second system information may have been previously obtained and stored in memory and may have been received directly from the serving cell when the UE device was in coverage of the cell.

At step 708, a relay UE device is selected from the first candidate relay UE device and the second candidate relay UE device at least partially based on the selected system information received from each candidate. The remote UE device may evaluate any of several parameters to determine which relay UE device should be selected. Examples of criteria include information related to cell barring, provided services, and frequency reselection. The criteria may also be based on other information. For example, discovery signal resources used for transmitting the SL discovery messages may be used to determine the RSRP levels of the Uu link of each candidate relay UE device to its serving cell allowing the remote UE device to take into account the Uu link quality of each candidate when selecting a relay UE device.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A remote user equipment (UE) device comprising:

a receiver configured to receive a first PC5 groupcast message and a second PC5 groupcast message, the first PC5 groupcast message transmitted from a first candidate relay UE and comprising first selected system information that is a portion of first relay-received system information received at the first candidate relay UE from a first cell, the second PC5 groupcast message transmitted from a second candidate relay UE and comprising second selected system information that is a portion of second relay-received system information received at the second candidate relay UE from a second cell, wherein the first selected system information comprises first selected Minimum System Information (MSI) that is a portion of MSI transmitted by the first cell and the second selected system information comprises second selected MSI that is a portion of MSI transmitted by the second cell; and a controller configured to select, from the first candidate relay UE and the second candidate relay and at least partially based on the first selected system information and the second selected system information, a relay UE for UE-to-Network (U2N) communication.

2. The remote UE device of claim 1, wherein the first PC5 groupcast message is a first sidelink discovery message and the second PC5 groupcast message is a second sidelink discovery message.

3. The remote UE device of claim 1, wherein the first selected system information is remote UE cell access information for accessing the first cell and the second selected system information is remote UE cell access information for accessing the second cell.

4. The remote UE device of claim 3, wherein:

the first selected system information comprises a first selected System Information Block (SIB) that is a portion of an SIB transmitted by the first cell and the second selected system information comprises a second selected SIB which is a portion of an SIB transmitted by the second cell.

5. The remote UE device of claim 4, wherein:

the SIB transmitted by the first cell is one of SIB1, SIB3, SIB4 and SIB5 and the SIB transmitted by the second cell is one of SIB1, SIB3, SIB4 and SIB5.

6. The remote UE device of claim 1, wherein:

the first selected MSI comprises a first selected Master Information Block that is a portion of an MIB transmitted by the first cell and the second selected MSI comprises a second selected MIB that is a portion of an MIB transmitted by the second cell.

7. The remote UE device of claim 1, wherein the first selected system information comprises at least one of Unified Access Control (UAC) configuration, Public Land Mobile Network Identifier (PLMN ID), Tracking Area Code (TAC), Radio Access Network Notification Area Code (RNAC), cell Identifier (cell ID), RRCSetupRequest timer (T300), RRCResumeRequest timer (T319) for the first cell and the second selected system information comprises at least one of UAC configuration, PLMN ID, TAC, RNAC, cell ID, T300, T319 for the second cell.

8. The remote UE device of claim 1, wherein the first selected system information comprises neighbor frequency information indicating operating frequencies of first neighbor cells in proximity of the first cell and the second selected system information comprises neighbor frequency information indicating operating frequencies of second neighbor cells in proximity of the second cell.

9. The remote UE device of claim 8, wherein the first selected system information comprises first frequency priority information for cell reselection for the first cell and the second selected system information comprises second frequency priority information for cell reselection for the second cell.

10. The remote UE device of claim 9, wherein the first selected system information comprises a first cell frequency of the Uu link to the first cell on which the first candidate relay UE device is camped and the second selected system information comprises a second cell frequency of the Uu link to the second cell on which the second candidate relay UE device is camped.

11. A remote user equipment (UE) device comprising:

a receiver configured to receive a first PC5 groupcast message and a second PC5 groupcast message, the first PC5 groupcast message transmitted from a first candidate relay UE and comprising first selected system information that is a portion of first relay-received system information received at the first candidate relay UE from a first cell, the second PC5 groupcast message transmitted from a second candidate relay UE and comprising second selected system information that is a portion of second relay-received system information received at the second candidate relay UE from a second cell; and a controller configured to select, from the first candidate relay UE and the second candidate relay and at least partially based on the first selected system information and the second selected system information, a relay UE for UE-to-Network (U2N) communication, wherein the controller is configured to, when the remote UE device is a member of a groupcast group, refrain from using pre-configuration system information for a cell, the controller configured to place the receiver in active receiving state at an active ON time when a PC5 groupcast message is transmitted to a plurality of UE devices in the groupcast group, the PC5 groupcast message comprising selected system information for the cell, the receiver configured to receive the PC5 groupcast message from a relay UE device without an established PC5-RRC link to the relay UE device, the selected system information obtained by the relay UE device from the cell.

12. The remote UE device of claim 11, wherein the active ON time is identified by a sidelink DRX configuration and the receiver is further configured to receive a sidelink DRX configuration message from the relay UE device transmitting the sidelink DRX configuration message to the plurality of remote UE devices.

13. The remote UE device of claim 12, wherein the controller is configured to establish the sidelink DRX configuration through a negotiation procedure with the relay UE device.

14. The remote UE device of claim 11, wherein the controller is configured to establish the sidelink DRX configuration through a negotiation with the cell.

* * * * *